United States Patent [19]
Milewski

[11] 4,089,061
[45] May 9, 1978

[54] METHOD AND APPARATUS FOR DETERMINING THE INITIAL VALUES OF THE COEFFICIENTS OF A COMPLEX TRANSVERSAL EQUALIZER

[75] Inventor: Andrzej Tadeusz Milewski, Saint-Jeannet, France

[73] Assignee: International Business Machines Corporation, Armonk, N.Y.

[21] Appl. No.: 743,022

[22] Filed: Nov. 18, 1976

[30] Foreign Application Priority Data

Dec. 30, 1975  France ............................ 75 40417

[51] Int. Cl.$^2$ ............................................. H04B 3/04
[52] U.S. Cl. ..................................... 364/724; 325/42; 333/18
[58] Field of Search ................. 235/152, 156; 325/42; 333/18; 328/167

[56] References Cited

U.S. PATENT DOCUMENTS

| | | | |
|---|---|---|---|
| 3,715,666 | 2/1973 | Mueller et al. .................... | 325/42 |
| 3,723,911 | 3/1973 | Forney .............................. | 333/18 |
| 3,978,407 | 8/1976 | Forney et al. ..................... | 325/42 |
| 4,006,352 | 2/1977 | Sato .................................. | 235/152 |

*Primary Examiner*—David H. Malzahn
*Attorney, Agent, or Firm*—Thomas J. Kilgannon, Jr.

[57] ABSTRACT

A method for determining the initial values of the coefficients of a complex transversal equalizer in a synchronous data transmission system employing Double Side Band-Quadrature Carrier (DSB-QC) modulation on a transmission channel having variable distortion from message to message is disclosed. The coefficients are derived from training sequences which consist of periodic pseudo-random sequences of complex numbers having a periodic autocorrelation function, all the coefficients of which except the first are zero. The amplitude of all complex numbers of the sequence is constant. Sequences with these characteristics are identified as CAZAC sequences. With the exception of a training sequence generator and a coefficient generator the system utilized is a conventional data transmission system utilizing the DSB-QC modulation technique.

12 Claims, 6 Drawing Figures

METHOD AND APPARATUS FOR DETERMINING THE INITIAL VALUES OF THE COEFFICIENTS OF A COMPLEX TRANSVERSAL EQUALIZER

BACKGROUND OF THE INVENTION

1 Field of the Invention

This invention relates to the synchronous data transmission systems which use double sideband-quadrature carrier (DSB-QC) modulation and, more particularly, to a method and a device for quickly determining the initial values of the coefficients of a complex transversal equalizer.

Generally, the invention proposes a method of determining the initial values of the coefficients of a complex transversal equalizer wherein the training sequences consist of periodic pseudo-random sequences of complex numbers having a periodic autocorrelation function, all the coefficients of which except the first are zero, the amplitude of all complex numbers of the sequence being constant.

2. Description of the Prior Art

In the synchronous data transmission systems, the bit sequence or message to be transmitted is first converted into a sequence of symbols each of which can take on a discrete number of values that is generally equal to a power of two. The symbols are then sent over a transmission channel at a given rate, called signaling rate, in the shape of pulses that may or may not be modulated depending on whether or not the transmission system uses a carrier modulation technique. Generally, the transmission channels, and more particularly the telephone lines, introduce amplitude and phase distortions that modify the shape and the signals. These distortions are generally due to the imperfect transfer characteristics of the transmission channels involved and are aggravated by the noise introduced therein by external sources, which are more or less difficult to control. The amplitude and phase distortions can create an interaction between successive signals. This interaction, known as intersymbol interference, may preclude reliable detection of the data by the receiver. In high speed data transmission systems, the receivers are generally provided with a device designed to minimize the effects of intersymbol interference before the data are detected. Such a device is called an equalizer.

The type of equalizer which is the most widely used at the present time is the automatic transversal equalizer described, for example, in "Principles of Data Communication" by R. W. Lucky, J. Salz and E. D. Weldon, Jr., Chapter 6, McGraw-Hill, New York, 1968. Such an equalizer consists of a transversal filter whose coefficients are automatically adjusted to meet a given performance criterion. In general, during an initial period referred to as a training period, a set of isolated test pulses or a periodic pseudo-random binary training sequence is transmitted to allow the equalizer coefficients to be adjusted to initial values that are as close as possible to optimum values. At the end of the training period, the initial values will remain unchanged during transmission of the message, if the equalizer is not of the adaptive type; alternatively, they can be adjusted at any time during transmission of the message, if an adaptive equalizer is used.

If the distortion characteristics of the transmission channel vary between successive messages, which is the case where the channel consists of public telephone lines, a training period must be provided before transmission of every message. However, the efficiency of a data transmission system is generally determined by working out the ratio of the time required for transmitting the message to the occupancy time of the line, the latter time corresponding essentially to the training period plus the message transmission time. If the efficiency level is to remain suitably high in high speed data transmission systems, in which a message can be transmitted in a few tens of milliseconds, provision must be made for a device capable of minimizing the duration of the training period, that is to say, of determining as quickly as possible the initial values of the equalizer coefficients.

U.S. patent application Ser. No. 701,730 filed by the present applicant July 1, 1976, discloses a method which allows the initial values of the coefficients of a transversal equalizer to be quickly determined. In this method, the training sequences consist of periodic sequences of pseudo-random real numbers having an autocorrelation function, all the coefficients of which are zero except the first coefficient, the sequences being derived from periodic pseudo-random binary (1,0) sequences exhibiting particular properties. While this method yields very good results, it has been found that it could be improved to meet the requirements of those synchronous data transmission systems which use DSB-QC modulation. DSB-QC modulation is a class of modulation techniques that includes phase shift keying (PSK), amplitude phase shift keying (A-PSK), and quadrature amplitude (QAM) modulation. The three techniques exhibit similarities and can often be dealt with as a single technique as it appears, for example, from chapters 7 and 9 of the above-mentioned book by R. W. Lucky et al., or from an article entitled "Adaptative Maximum-Likelihood Receiver for Carrier-Modulated Data Transmission Systems", by G. Ungerboeck, in IEEE Transactions on Communications, Vol.COM-22, No. 5, May 1974, pp.624–636, or again from an article entitled "Simultaneous Adaptive Estimation and Decision Algorithm for Carrier Modulated Data Transmission Systems", by H. Kobayashi, in IEEE Transactions on Communication Technology, Vol.COM-19, No. 3, June 1971, pp.268–280. One of the characteristics of DSB-QC modulation is that the data symbols are complex numbers. Thus, it is desirable to use training sequences which exhibit the same characteristics as the data symbols. Also, the systems which employ DSB-QC modulation generally use a so-called complex transversal equalizer, the coefficients of which can be represented by complex numbers, so that it is desirable to be able to derive the initial values of the complex coefficients directly from the training sequence involved.

SUMMARY OF THE INVENTION

In accordance with the broadest aspect of the present invention, a method for determining the values of the coefficients of a complex transversal equalizer in a synchronous data transmission system employing double sideband-quadrature carrier (DSB-QC) modulation on a transmission channel having variable distortion from message to message is taught. The equalizer coefficients are derived from a training sequence. The method includes the step of generating a CAZAC sequence which is a periodic pseudo-random sequence of complex numbers, all of which have a constant amplitude; the sequence having a periodic autocorrelation function, all the coefficients of which except the first are zero; transmitting the CAZAC sequence over the transmission channel during a training period; and determining the initial values of the coefficients of the transversal equalizer from the transmitted CAZAC sequence during said training period.

In accordance with the broader aspects, the step of determining the initial value of the coefficient includes the steps of determining the samples, $r_n$, of the transmission channel impulse response by correlating over a given period of time, L, the elements of the received sequence ($z_i$) with those of the transmitted sequence ($u_i$); calculating the autocorrelation matrix, $\Gamma$, of the samples $r_n$; and determining the initial values of the coefficients from the relation $C_{opt} = \Gamma^{-1}R$, wherein $C_{opt}$ is the column vector of the coefficient values, $\Gamma^{-1}$ is the inverse of matrix $\Gamma$, and R is the inverted column vector of $r_n$.

In accordance with still another aspect of the present invention, the step of transmitting said CAZAC sequence includes the steps of storing the real and imaginary parts of the CAZAC sequence; providing a pair of carriers, the phases of which are in phase quadrature; modulating one and the other of said pair of carriers with the real and imaginary parts of the stored CAZAC sequence; and subtracting the modulated carriers to provide a resultant signal which is a complex signal representing, during each signalling interval, the real and imaginary parts of the CAZAC sequence which modulated the pair of carriers.

In accordance with a more specific aspect of the invention, the initial values of the coefficients of the equalizer are determined as follows:

the values of the samples $r_n$ of the complex impulse response of the transmission channel are determined using the cross-correlation expression $$r_g = \frac{1}{L} \sum_{i=0}^{L-1} z_{i+g} u_i^*$$

where $u_i$ = elements of the transmitted sequence, and
$z_i$ = elements of the received sequence;
the autocorrelation matrix $\Gamma$ of samples $r_n$ is calculated; and
the values of the equalizer coefficients are determining using the matrix relation $$C_{opt} = \Gamma^{-1}R$$

where $C_{opt}$ is the column vector of all coefficients,
L is the period of the transmitted sequence,
$\Gamma^{-1}$ is the inverse of matrix $\Gamma$, and
R is the inverted column vector of the samples of the transmission channel impulse response.

Accordingly, it is an object of this invention to provide a method and a device for determining the optimum theoretical values of the coefficients of a complex transversal equalizer.

It is another object of the invention to provide such a method and such a device to allow the initial values of said coefficients to be very quickly determined.

It is still another object of the invention to provide such a method and such a device to allow the initial values of the coefficients of a complex equalizer to be very quickly determined through a direct method.

The foregoing and other objects, features and advantages of the invention will be apparent from the following more particular description of preferred embodiments of the invention, as illustrated in the accompanying drawings.

DESCRIPTION OF PREFERRED EMBODIMENTS

Figure 1:
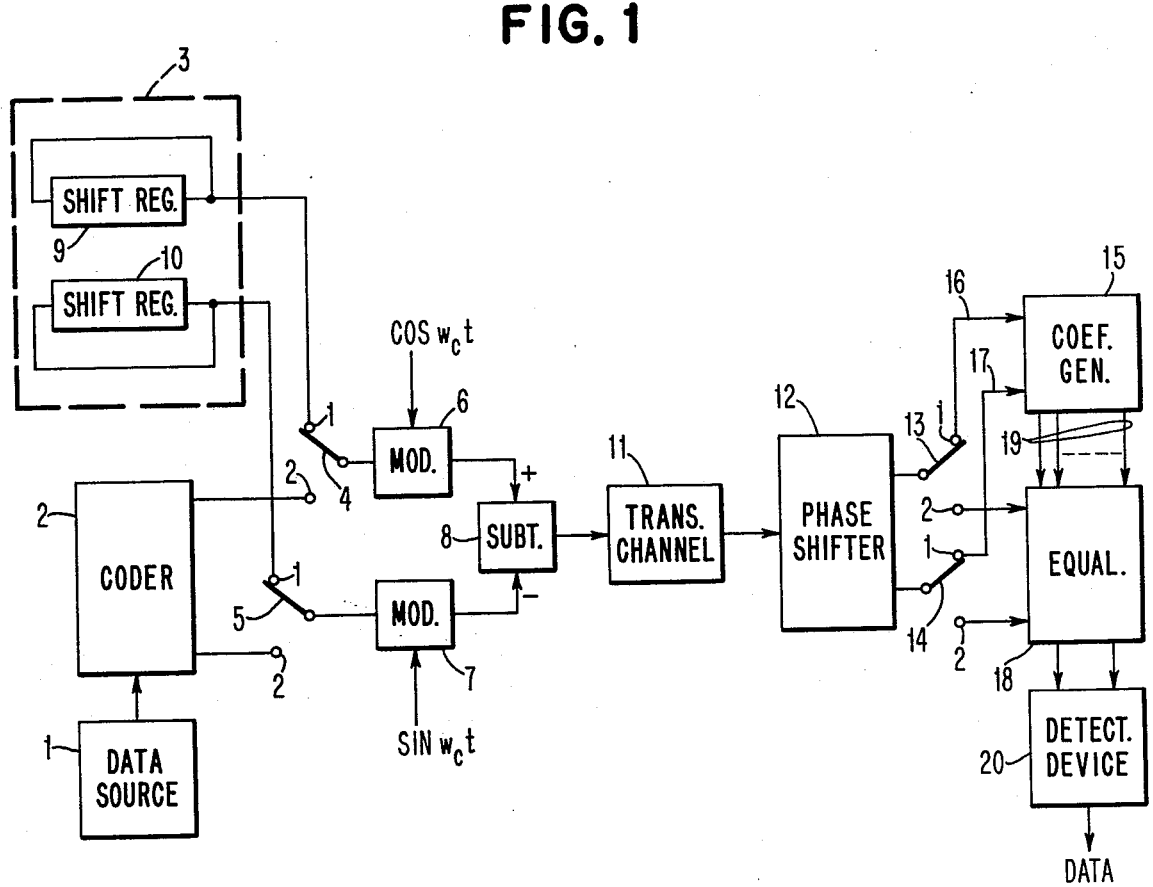
FIG. 1 is a simplified schematic diagram of a data transmission system incorporating a preferred embodiment of the invention.

In order that the invention may be more readily understood, a simplified diagram of a data transmission system incorporating a preferred embodiment of the invention has been illustrated in FIG. 1. With the exception of the training sequence generator 3 and the coefficient generator 15, the system shown in FIG. 1 is a conventional, prior art data transmission system utilizing the DSB-QC modulation technique. For clarity, only those components which are necessary to understand the invention have been illustrated. Thus, analog-to-digital converters, sampling devices, filters, clock recovery devices and other components which are normally found in any transmission system have not been shown. In FIG. 1, the transmitter of the system includes a source of data 1, a coder 2, a training sequence generator 3, a couple of two-position switches 4 and 5, two modulators 6 and 7, and a subtractor 8. The source 1 is connected to the input of the coder 2, the two outputs of which are respectively connected to position 2 of switches 4 and 5. The signal generator 3 is essentially comprised of two shift registers 9 and 10 employing feedback connections, the outputs of which registers are respectively connected to position 1 of switches 4 and 5. The outputs of switches 4 and 5 are respectively connected to the inputs of modulators 6 and 7, the outputs of which are respectively connected to the (+) and (−) inputs of subtractor 8. The output of subtractor 8 is connected to the input of a transmission channel 11, the output of which is connected to a 90° phase shifter 12, the two outputs of which are respectively connected to the inputs of a couple of two-position switches 13 and 14. Positions 1 of switches 13 and 14 are connected to the inputs of a coefficient generator 15 via lines 16 and 17. Positions 2 of switches 13 and 14 are connected to the inputs of a complex transversal equalizer 18 which receives via lines 19 the coefficient values supplied by coefficient generator 15. The outputs of equalizer 18 are connected to a detection device 20 which supplies the detected data.

In the data mode of operation, i.e., when the system is transmitting data, switches 4, 5, 13 and 14 are set to position 2. The sequence of bits supplied by the data source 1 is converted in coder 2 into two sequences of symbols. At each of the signaling instants defined by the signaling rate 1/T expressed in bauds, two symbols, one from each sequence, are respectively fed through switches 4 and 5 to modulators 6 and 7 where they serve to modulate the amplitude of two carriers in quadrature, cos $\omega_c t$ and sin $\omega_c t$. The output of modulator 7 is subtracted from that of modulator 6 by subtractor 8 and the resultant signal is transmitted over channel 11. The signal transmitted at each signaling instant can take on any one of N distinct values represented by a set of N complex numbers. In general, $N=2^n$ and n bits can be transmitted at each signaling instant. The signal transmitted at each signaling instant may be represented by a complex data symbol the real part of which is the symbol fed to modulator 6 and the imaginary part of which is the symbol fed to modulator 7. For more details, reference should be made to the book and articles cited above as well as to section 4-4, pp. 70–97 of "Signal Theory" by L. E. Franks, Prentice-Hall, Inc., Englewood Cliffs, N.J., 1969, in which the signal representation methods are discussed. For clarity, the transmitter shown uses the so-called baseband transmission technique, but those skilled in the art will readily understand that the direct passband transmission technique could also be employed, using, for example, the digital echo transmitter disclosed in U.S. Pat. No. 3,747,024, filed Oct. 26, 1971.

The signal received from transmission channel 11 is applied to the input of the 90° phase shifter 12. The latter type of device is also known as a Hilbert transformer and supplies the in-phase and quadrature components of the received signal. As is known, a Hilbert transformer is generally comprised of two conventional passband filters one of whose outputs is 90° in phase later than the other. The in-phase and quadrature components of the received signal are applied to the inputs of a complex transversal equalizer 18 of the type described, for example, in U.S. Pat. No. 3,947,768, filed Jan. 8, 1975. The equalized in-phase and quadrature components are then applied to the input of data detection device 20 which can be of the type disclosed, for example, in U.S. Pat. No. 4,024,342, filed Nov. 6, 1975.

During the training period, switches 4, 5, 13 and 14 are set to position 1. At each signaling instant, sequence generator 3 supplies a pair of symbols which are modulated by modulators 6 and 7. A complex symbol corresponding to this pair of symbols is then transmitted. Phase shifter 12 supplies the in-phase and quadrature components, or the real and imaginary parts, of the received symbol which are fed to the coefficient generator 15. At the end of the training period, generator 15 provides via lines 19 the initial values of the coefficients of equalizer 18. Switches 4, 5, 13 and 14 are then set to position 2 and the data are transmitted.

The method of the present invention will now be described with reference to FIGS. 2 to 5. A discussion of the pseudo-random sequences will be found, for example, in "Error Correcting Codes" by W. W. Peterson, published jointly by the MIT Press and John Wiley & Sons, Inc., New York, 1961; in "Digital Communications with Space Applications" by S. W. Golomb, Prentice-Hall, Inc., Englewood Cliffs, N.J., 1964; and in an article entitled "Sequences with Small Correlation" by T. Turyn, in the book "Error Correcting Codes", edited by H. B. Mann and published by John Wiley & Sons, Inc., New York, 1968. In accordance with the method disclosed in the above-mentioned U.S. patent application Ser. No. 701,730, the training sequences consist of periodic pseudo-random sequences of real numbers having a periodic autocorrelation function, all the coefficients of which except the first are zero. In the present invention, the training sequences used are periodic pseudo-random sequences of constant-amplitude complex numbers having a periodic autocorrelation function, all the coefficients of which except the first are zero.

In accordance with one aspect of the invention, such sequences are derived from binary pseudo-random sequences exhibiting a property P1 which will presently be defined.

As used hereinafter, $(a_i)$ will designate a binary pseudo-random sequence of period or length L:

$$(a_i) = a_o a_1 a_2 \ldots a_{L-1}$$

where the elements $a_i$ are equal to $\pm 1$.

The autocorrelation matrix of this sequence is written:

$$A = \begin{bmatrix} A_o & A_1 & \cdots & A_{L-1} \\ A_1 & A_o & & A_{L-2} \\ \vdots & & & \vdots \\ A_{L-1} & & & A_o \end{bmatrix}$$

where $A_g$ is the $g^{th}$ coefficient of the periodic autocorrelation function:

$$A_g = \sum_{i=0}^{L-1} a_i a_{i+g}$$

for $g = 0, 1, \ldots, (L-1)$.

All sequences $(a_i)$ such that
$A_o = L$ and $A_g = 1$ for $g-1, \ldots, (L-1)$
are said to have the property P1.

Figure 2:
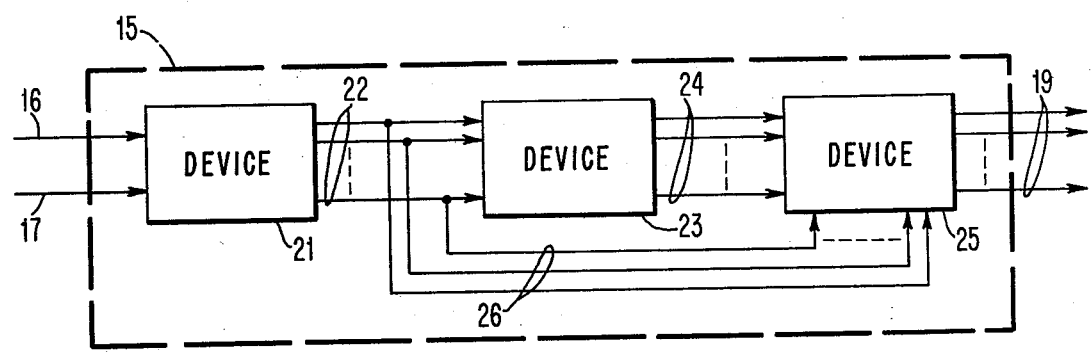
FIG. 2 is a block diagram of the coefficient generator of FIG. 1.

The binary pseudo-random sequences that are known as maximum length binary pseudo-random sequences exhibit property P1. The latter sequences are defined, for example, in the book by W. G. Golomb cited above and in section 8-3 of W. W. Peterson's book entitled "Error Correcting Codes", published jointly by The MIT Press and John Wiley and Sons, Inc., New York, 1961. Such a sequence of length $L = 2^K - 1$ is generated by a K-stage shift register, as shown in FIG. 2 of U.S. patent application Ser. No. 701,730 mentioned earlier.

For example, for L=15, one obtains the sequence $$0 0 0 1 0 0 1 1 0 1 0 1 1 1 1 \quad (1)$$

Replacing each 0 by $-1$, one obtains a sequence which exhibits property P1 and is written:

$$-1 -1 -1 1 1 -1 -1 1 1 1 -1 1 1 -1 1 1 1 1 1 \quad (2)$$

Another family of periodic binary pseudo-random sequences exhibiting property P1 comprises all sequences whose elements are determined by the quadratic and non-quadratic residues of prime numbers of the $4K-1$ form, as described, for example, in the article by R. Turyn cited above. The elements of these sequences are calculated mathmatically in the manner described in the references cited by R. Turyn. These sequences have a length L defined as $$L = 4K - 1$$

where L is a prime number and K a positive integer. For example, for L=11, the following sequence is obtained:

$$1\ 1\ -1\ 1\ 1\ 1\ -1\ -1\ -1\ 1\ -1 \quad (3)$$

The sequences of the present invention are obtained by adding an imaginary constant $j\alpha$ to each of the elements $a_i$ of the sequences which have the property P1. This constant is defined as $$\alpha = \pm 1/\sqrt{L} \quad (4)$$

For example, in the case of sequence (2) of length $L=15$, one obtains $$\alpha = \pm 0.2582$$

If, for example, a value of $\alpha = \pm 0.2582$ is selected, sequence (2) becomes:
$-1 + 0.2582j$; $-1 + 0.2582j$; $-1 + 0.2582j$; $+1 + 0.2582j$; $-1 + 0.2582j$; $-1 + 0.2582j$; $+1 + 0.2582j$; $+1 + 0.2582j$; $-1 + 0.2582j$; $+1 + 0.2582j$; $-1 + 0.2582j$; $+1 + 0.2582j$; $+1 + 0.2582j$; $+1 + 0.2582j$; $+1 + 0.2582j$.

The sequence thus obtained will be designated $(u_i)$ hereafter.

The autocorrelation matrix of these sequences is written:

$$U = \begin{bmatrix} U_0 & U_1 & U_2 & \cdots & U_{L-1} \\ U_1 & U_0 & & & U_{L-2} \\ U_2 & U_1 & U_0 & & \cdot \\ \cdot & & & & \cdot \\ \cdot & & & & U_1 \\ U_{L-1} & \cdots & & \cdots & U_0 \end{bmatrix}$$

where $U_g$ is the $g^{th}$ coefficient of the periodic autocorrelation function $$U_g = \sum_{i=0}^{L-1} u_i u^*_{i+g} \quad (5)$$

for $g = 0, 1, \ldots, (L-1)$, and
$u_{i+g}^*$ is the complex conjugate of $u_{i+g}$.

It can be demonstrated by using the teachings of the aforementioned patent application Ser. No. 701,730 that all sequences $(u_i)$ have the following property P2:
$U_o \neq 0$ and $U_g = 0$ for $g=1, \ldots, (L-1)$.
Subsequently, it will further be assumed that $$U_o = L$$

which can be obtained conventionally by dividing each element of sequence $(u_i)$ by a suitable factor.

Hereafter, it will be assumed that the transmitted training sequences $(u_i)$ have the following property P3:
$U_o=L$ and $U_g=0$ for $g=1, \ldots, (L-1)$.

Such sequences, which have an autocorrelation function all the coefficients of which except the first, $U_o$, are zero and all of elements are complex numbers having a constant amplitude, will be referred to hereafter as "CAZAC sequences".

Another family of CAZAC sequences, as defined above, is comprised of sequences $(u_i)$ of length $L=K^2$ defined as $$u_i = W^{\beta\gamma}$$

where
$\beta, \gamma = 0, 1, \ldots, (K-1)$
$i = K\beta + \gamma = 0, 1, \ldots, (L-1)$, and
$W$ is a primitive $K^{th}$ root of unity, e.g., $$W = \exp(2j\pi/K).$$

The sequence can be obtained by using the elements in the successive rows of the matrix $(W^{\beta\gamma})$.

For example, for $K=4$, $L=16$, and $W = \exp(j\pi/2)$, the matrix $(W^{\beta\gamma})$ is written $$(W^{\beta\gamma}) = \begin{bmatrix} \exp(0 \times j\pi/2) & \exp(0 \times j\pi/2) & \exp(0 \times j\pi/2) & \exp(0 \times j\pi/2) \\ \exp(0 \times j\pi/2) & \exp(j\pi/2) & \exp(2 \times j\pi/2) & \exp(3 \times j\pi/2) \\ \exp(0 \times j\pi/2) & \exp(2 \times j\pi/2) & \exp(4 \times j\pi/2) & \exp(6 \times j\pi/2) \\ \exp(0 \times j\pi/2) & \exp(4 \times j\pi/2) & \exp(6 \times j\pi/2) & \exp(9 \times j\pi/2) \end{bmatrix}$$

$$(W^{\beta\gamma}) = \begin{pmatrix} 1 & 1 & 1 & 1 \\ 1 & j & -1 & -j \\ 1 & -1 & 1 & -1 \\ 1 & -j & -1 & j \end{pmatrix}$$

The following sequence is obtained:

$$1\ 1\ 1\ 1\ 1\ j\ -1\ -j\ 1\ -1\ 1\ -1\ 1\ -j\ -1\ j$$

It should be noted that the elements of this sequence have a constant amplitude equal to 1 and can have four different phases.

Another family of CAZAC sequences is comprised of all sequences $(u_i)$ of length $L=$odd integer, defined as $$u_i = W^{i^2}$$

where
$i = 0, \ldots, (L-1)$, and
$W$ is a primitive $L^{th}$ root of unity.

For example, with $L=3$ and $W=\exp(j2\pi/3)$, the following sequence is obtained:
$1, \cos 2\pi/3 + j \sin 2\pi/3, \cos 2\pi/3 + j \sin 2\pi/3$.

Another family of CAZAC sequences comprises the sequences $(u_i)$ of length $L=m^{2K+1}$ defined as $$u_i = a_{\beta \text{ (modulo } m)} W^{\beta\gamma}$$

where
$(a_n)$ is a CAZAC sequence of length $m$
$n = 0, 1, \ldots, (m-1)$ $\beta = 0, 1, \ldots, (M-1)$ $M = m^{K+1}$
$\gamma = 0, 1, \ldots, (N-1)$ $N = m^K$
$i = M\beta + \gamma$, and
$W$ is a primitive $M^{th}$ root of unity.

The sequence can conveniently be obtained by using the various elements in the successive rows of the M × N matrix defined as $$(a_{\beta \text{ (modulo } m)}) W^{\beta\gamma}$$

For example, for $m=2$ and $k=1$, one has $L=2^3=8$, $M=2^2=4$, $N=2^1=2$, and $W=\exp j\pi/2=j$.
If $(a_n)=1$, $j$ is selected as a CAZAC sequence of length $m=2$, the following matrix is obtained:

$$\begin{matrix} 1 \times W^{0 \times 0} & 1 \times W^{0 \times 1} \\ j \times W^{1 \times 0} & j \times W^{1 \times 1} \end{matrix} \quad \begin{matrix} 1 & 1 \\ j & -1 \end{matrix}$$

-continued $$\begin{pmatrix} 1 \times W^{2\times 0} & 1 \times W^{2\times 1} \\ j \times W^{2\times 0} & j \times W^{2\times 1} \end{pmatrix} = \begin{pmatrix} 1 & -1 \\ j & 1 \end{pmatrix}$$

Using the various elements in the successive rows of the matrix, one obtains the following sequence:

$$1\ 1\ j\ -1\ 1\ -1\ j\ 1$$

According to another aspect of the invention, a CAZAC sequence $(u_i)$ of length $L=4m$ is used which is derived from two CAZAC sequences $(a_i)$ and $(b_i)$ of length $m$.

Sequence $(u_i)$ is obtained by putting $$u_{2k} = a_{k\,(modulo\ m)}$$

$$u_{2k+1} = b_{k\,(modulo\ m)}\,W^k$$

for $k=0,1,\ldots,(2m-1)$ where W is a primitive $(2m)^{th}$ root of unity.

For example, from the CAZAC sequences of length $m=4$, $$(a_i) = (b_i) = 1\ 1\ 1\ -1$$

one obtains the following CAZAC sequence $(u_i)$ of length $L=16$ $$1,\ 1,\ 1,\ e^{j\pi/4},\ 1,\ j,\ -1,\ -e^{3j\pi/4},$$

$$1,\ -1,\ 1,\ e^{5j\pi/4},\ 1,-j,\ -1,\ -e^{7j\pi/4}.$$

According to still another aspect of the invention, one may use a CAZAC sequence $(u_i)$ of length $L=m\times n$ where $m$ is relatively prime to $n$, which sequence is derived from two CAZAC sequences $(a_i)$ and $(b_i)$ of length $m$ and $n$, respectively. The sequences $(u_i)$ is obtained by putting $$u_i = a_{i\,(Mod\ m)} \times b_{i\,(mod\ n)}$$

$$i = 1, 2, \ldots, m \times n.$$

The CAZAC sequences having thus been described, the implementation of the generator of such sequences will be readily apparent. As shown by way of example at 3 in FIG. 1, this generator may simply consist of two L-stage shift registers 9 and 10 employing feedback connections and in which the real and imaginary parts of the sequence elements are respectively stored. The contents of these registers are simultaneously shifted at the signaling rate under the control of a clock.

In accordance with the method of the present invention, the initial values of the equalizer coefficients are determined from the received sequence. This can be done in a conventional manner by using, for example, the technique described in an article entitled "An Automatic Equalizer for General Purpose Communication Channels", by R. W. Lucky and H. R. Rudin, in The Bell System Technical Journal, April 1967, pp.2179-2208, and in an article entitled "Cyclic Equalization — A New Rapidly Converging Equalization Technique for Synchronous Data Communication" by K. H. Mueller and D. A. Spaulding in The Bell Technical Journal, February 1975, pp.369-406.

In accordance with a preferred embodiment of the invention, a direct method is used to determine the values of the equalizer coefficents. The techniques that are generally employed to this end, such as those described in the latter two articles, rely upon the use of the matrix relation $$C_{opt} = \Lambda^{-1} E. \qquad (6)$$

Where
$C_{opt}$ is the column vector whose terms are the equalizer coefficients, $\Lambda$ is the autocorrelation matrix of the received sequence, and, $E$ is the column vector whose terms are the terms of the cross-correlation between the transmitted sequence and the received sequence.

Actually, relation (6) does not provide the theoretical optimum values of the equalizer coefficients. Such values can be determined using the relation $$C_{opt} = \Gamma^{-1} R \qquad (7)$$

where
$\Gamma$ is the autocorrelation matrix of the transmission channel impulse response, and $R$ is the inverted column vector whose terms are the samples of the transmission channel impulse response. The term "inverted" indicates that the first term of vector R is the last sample of the impulse response.

Relations (6) and (7) are identical only where the sequence is of infinite length, which is not true in practice.

In the preferred embodiment of the invention, relation (7) is used to determine the values of the equalizer coefficients. This involves the steps of:

directly determining vector R, calculating matrix $\Gamma$, and determining vector $C_{opt}$.

None of these steps requires the use of the equalizer proper. For this reason, the coefficient generator 15 shown in FIG. 1 is distinct from the equalizer 18.

For clarity, an exemplary digital implementation of generator 15 has been illustrated in block diagram form in FIG. 2. The in-phase components (real parts) and the quadrature components (imaginary parts) of the received sequence are applied via lines 16 and 17, respectively, to a device 21 which is used to determine the values of the samples of the transmission channel impulse response. These samples are applied via lines 22 to a device 23 which calculates the autocorrelation matrix thereof. The elements of this matrix are in turn applied via lines 24 to a device 25 which determines the values of the equalizer coefficients. Device 25 also receives via lines 26 the samples determined by device 21. These samples are applied to equalizer 18 via lines 19.

An exemplary digital embodiment of device 21, which serves to determine the values of the samples of the transmission channel impulse response, will now be described with reference to FIG. 3.

It will be assumed that the length L of the transmitted sequence $(u_i)$ is equal to or greater than the length of the impulse response of the transmission channel. If the samples of the complex impulse response of the transmission channel are designated $r_n$, then $r_n = 0$ if $n < N_1$ or $n > N_2$ with $$L \geq N_2 - N_1 + 1$$

The $i^{th}$ element $z_i$ of the received sequence is conventionally written $$z_i = \sum_{n=N_1}^{N_2} u_{i-n} r_n \qquad (8)$$

The $g^{th}$ cross-correlation function between the elements $z_i$ of the received sequence and the elements $u_i$ of the transmitted sequence is conventionally written $$\sum_{i=o}^{L-1} z_{i+g} u_i^* \qquad (9)$$

Substituting (8) into (9), we obtain $$\sum_{i=o}^{L-1} z_{i+g} u_i^* = \sum_{i=o}^{L-1} (\sum_{n=N_1}^{N_2} u_{i+g-n} r_n) u_i^* \qquad (10)$$

$$\sum_{i=o}^{L-1} z_{i+g} u_i^* = \sum_{n=N_1}^{N_2} r_n \sum_{i=o}^{L-1} u_{i+g-n} u_i^* \qquad (11)$$

From (6), we have $$\sum_{i=o}^{L-1} z_{i+g} u_i^* = \sum_{n=N_1}^{N_2} r_n U_{n-g} \qquad (12)$$

According to property P2 of sequences $(u_i)$, the only term that is not zero is the term $U_o$ which corresponds in relation (12) to $n=g$. Relation (12) then becomes $$\sum_{i=o}^{L-1} z_{i+g} u_i^* = r_g U_o \qquad (13)$$

In accordance with property P3 of sequences $(u_i)$, we also have $$\sum_{i=o}^{L-1} z_{i+g} u_i^* = L r_g \qquad (14)$$

Hereafter, the following notations will be used:
$x_i$ real part (in phase component) of element $z_i$ of the received sequence;
$y_i$ imaginary part (quadrature component) of element $z_i$ of the received sequence;
$v_i$ real part of element $u_i$ of the transmitted sequence;
$w_i$ imaginary part of element $u_i$ of the transmitted sequence;
$p_i$ real part of sample $r_i$ of the channel impulse response;
$q_i$ imaginary part of sample $r_i$ of the channel impulse response.

The values of the real and imaginary parts of the impulse response samples are obtained by conventionally splitting up relation (14) in the form:

$$p_g = \frac{1}{L} \left( \sum_{i=o}^{L-1} x_{i+g} v_i + \sum_{i=o}^{L-1} y_{i+g} w_i \right) \qquad (15)$$

$$q_g = \frac{1}{L} \left( \sum_{i=o}^{L-1} y_{i+g} v_i - \sum_{i=o}^{L-1} x_{i+g} w_i \right)$$

Figure 3:
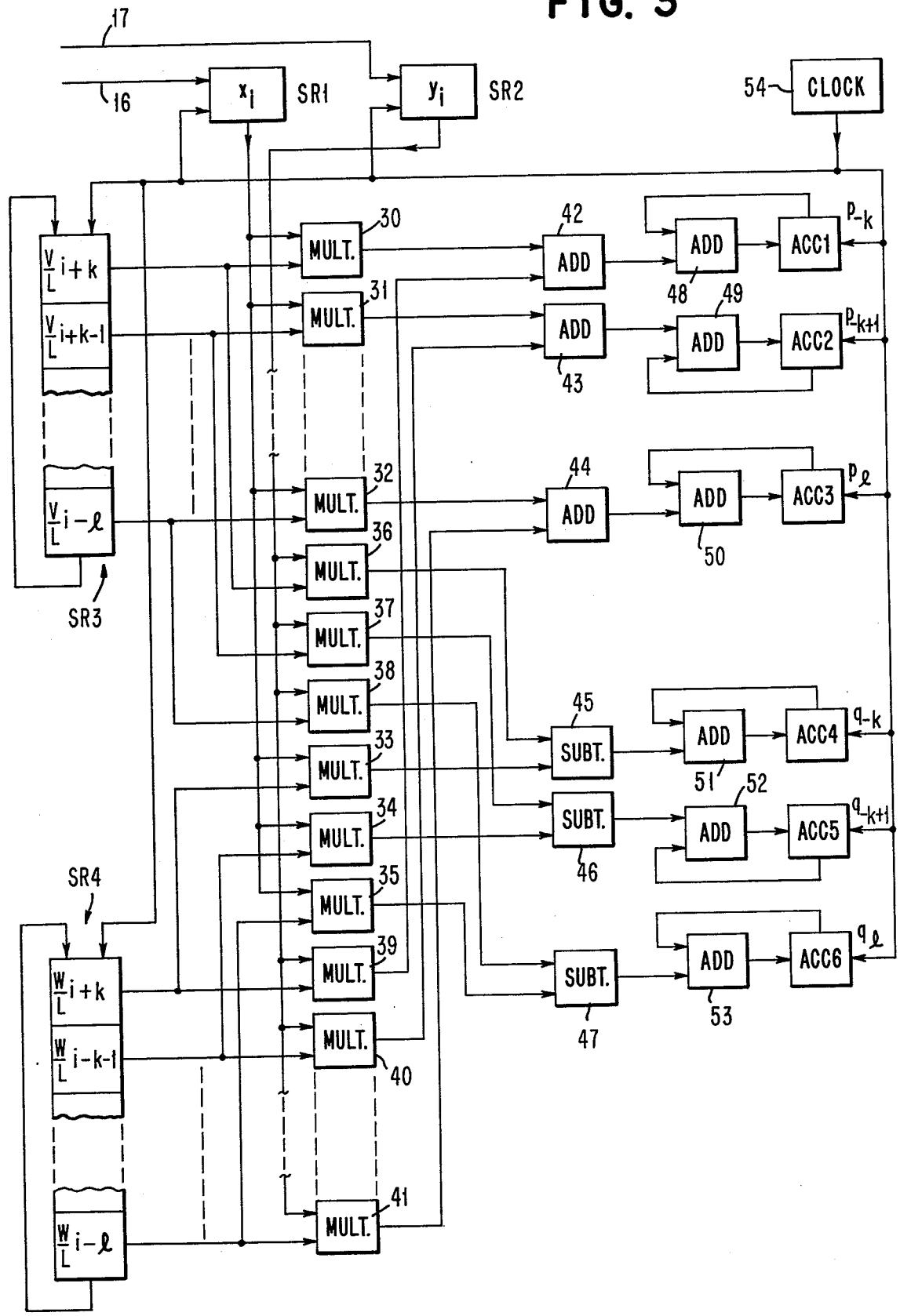
FIG. 3 illustrates in detail an exemplary embodiment of a device which is shown in block form in FIG. 2 and is used to determine the values of the samples of the transmission channel impulse response.

The device 21 illustrated in FIG. 3 serves to determine the values of the samples $r_n$ of the complex impulse response of the transmission channel through the use of relations (15). The outputs of the 90° phase shifter 12 of FIG. 1 are respectively connected to a pair of one-stage shift registers SR1 and SR2 via lines 16 and 17. The device shown further includes two L-stage shift registers SR3 and SR4 that employ feedback connections. The output of SR1 is connected in parallel to a first input of two sets of L multipliers each. Only three multipliers 30, 31, 32 of the first set and three multipliers 33, 34, 35 of the second set have been shown in the figure. The second inputs of multipliers 30-32 are respectively connected to the outputs of the L stages of register SR3. The second inputs of multipliers 33, 34, . . . , 35 are respectively connected to the outputs of the L stages of register SR4. The output of register SR2 is connected in parallel to a first input of a third and fourth sets of L multipliers. Only three multipliers 36, 37, 38 of the third set and three multipliers 39, 40, 41 of the fourth set have been illustrated. The second inputs of multipliers 36, 37, . . . , 38 are respectively connected to the outputs of the L stages of register SR3. The second inputs of multipliers 39, 40, . . . , 41 are respectively connected to the outputs of the L stages of register SR4. The outputs of the L multipliers of the first set are respectively connected to an input of L adders 42, 43, . . . , 44, the other inputs of which are respectively connected to the outputs of the L multipliers 39, 40, . . . , 41 of the fourth set. The outputs of the L multipliers 36, 37, . . . , 38 of the third set are respectively connected to the (+) input of L subtractors 45, 46, . . . , 47. The outputs of the L multipliers 33, 34, . . . , 35 of the second set are respectively connected to the (−) input of subtractors 45, 46, . . . , 47. The outputs of the L adders 42, 43, . . . , 44 are respectively connected to another input of the L adders 48, 49, . . . , 50, the outputs of which are respectively connected to the input of L accumulator registers ACC1, ACC2, . . . , ACC3. The outputs of registers ACC1, ACC2, . . . , ACC3 are respectively connected to the other input of adders 48, 49, . . . , 50. The outputs of the L subtractors 45, 46, . . . , 47 are respectively connected to an input of L adders 51, 52, . . . , 53 the outputs of which are respectively connected to the input of L accumulator registers ACC4, ACC5, . . . , ACC6. The outputs of registers ACC4, ACC5, . . . , ACC6 are respectively connected to the other input of adders 51, 52, . . . , 53. The contents of registers SR1-SR4 and ACC1-ACC6 are shifted at the signaling rate under control of a local clock 54.

In operation, it will be assumed that the CAZAC sequence has a length $L=k+l+1$. The real and imaginary parts of the elements of the CAZAC sequence, which have previously been divided by L, are stored in registers SR3 and SR4. When element $z_i$ of the transmitted sequence is received, its real and imaginary parts $x_i$ and $y_i$, as supplied by phase shifter 12 (FIG. 1), are stored in registers SR1 and SR2, respectively. The real part $x_i$ is simultaneously multiplied by (1/L) $v_{i+k}, \ldots,$ (1/L) $v_{i-l}$ using multipliers 30, 31, . . . , 32, and by (1/L) $w_{i+k}, \ldots,$ (1/L) $w_{i-l}$ using multipliers 33, 34, . . . , 35. The imaginary part $y_i$ is simultaneously multiplied by (1/L) $v_{i+k}, \ldots,$ (1) $v_{i-l}$ by means of multipliers 36, 37, . . . , 38, and by (1/l) $W_{i+k}, \ldots,$ (1/L) $w_{i-l}$ by means of multipliers 39, 40, . . . , 41. This yields (1/L) $x_i v_{i+k}$ + (1/L) $y_i w_{i+k}$  in ACC1, $(1/L) x_i v_{i-l} + (1/L) y_i w_{i-l}$  in ACC3, $(1/L) y_i v_{i+k} - (1/L) x_i w_{i+k}$  in ACC4, and $(1/L) y_i v_{i-l} - (1/L) x_i w_{i-l}$  in ACC6.

Upon receipt of the next element of the sequence, the contents of the registers are shifted and the multiplication operations are repeated.

Once the L elements of the sequence have been received, the values of samples $p_{-k}, p_{-k+1}, \ldots, p_{+l}$ are obtained in registers ACC1, ACC2, ..., ACC3 and the values of samples $q_{-k}, q_{-k+1}, \ldots, q_{+l}$ in registers ACC4, ACC5, ..., ACC6, in accordance with relations (15).

Figure 4:
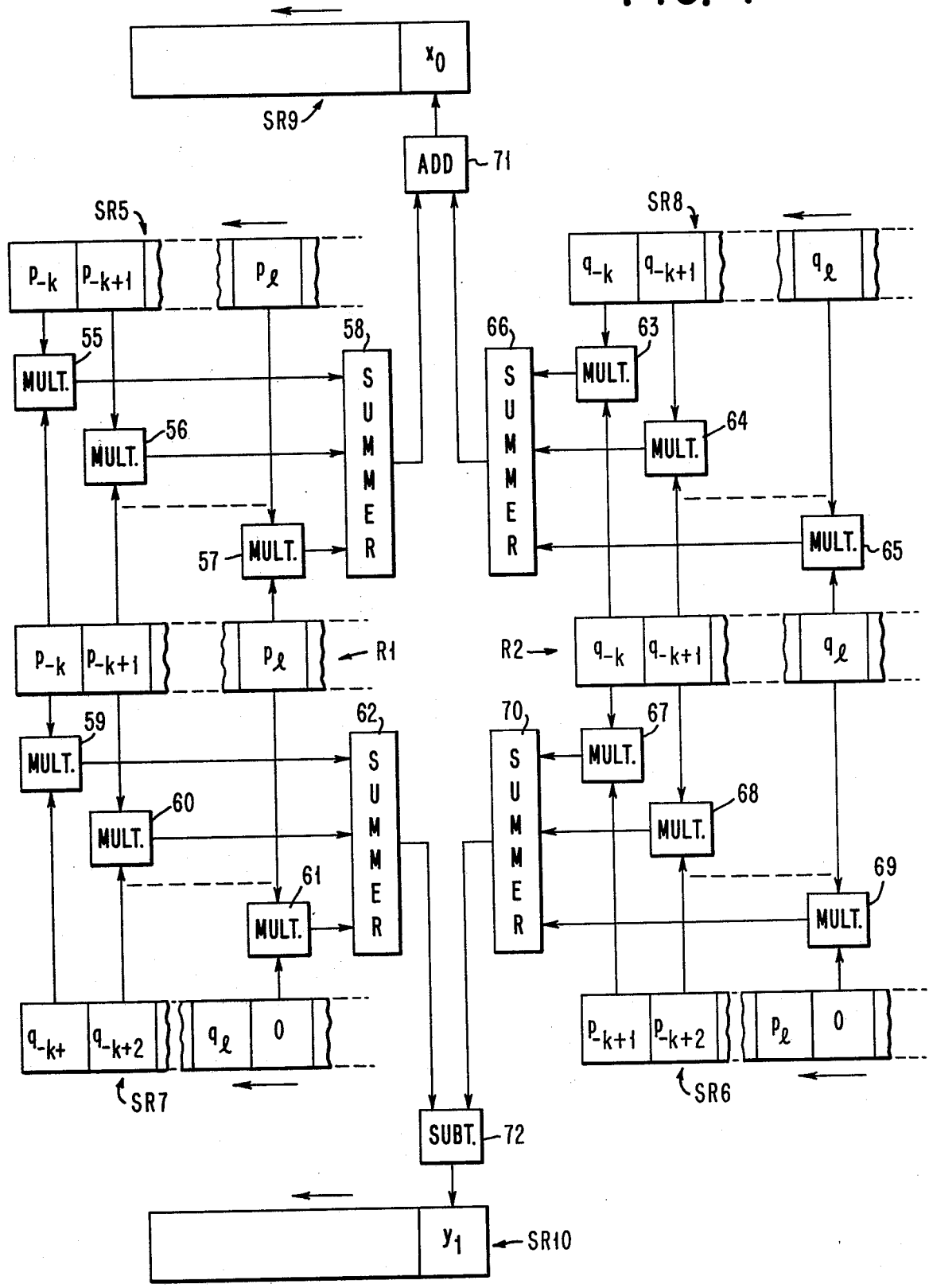
FIG. 4 represents a device which is shown in block form in FIG. 2 and is used to calculate the autocorrelation matrix of the transmission channel impulse response samples.

Referring now to FIG. 4, an exemplary digital embodiment of device 23 which is used to calculate the autocorrelation matrix Γ will be described. The samples $p_i$ of the impulse response calculated by the device of FIG. 3 are stored in an L-stage register R1. These samples, followed by a suitable number of 0's, are also stored in two shift registers SR5 and SR6 by well known means (not shown). The samples $q_i$ calculated by the device of FIG. 3 are stored in an L-stage shift register R2. Additionally, these samples, followed by a suitable number of 0's, are stored in two shift registers SR7 and SR8. The outputs of the L stages of register R1 are respectively connected to a first input of L multipliers 55, 56, ..., 57, the second inputs of which are respectively connected to the outputs of the first L stages of shift register SR5. The outputs of multipliers 55, 56, ..., 57 are connected to the inputs of a summer 58. In addition, the outputs of the L stages of register R1 are respectively connected to a first input of L multipliers 59, 60, ..., 61, the second inputs of which are respectively connected to the outputs of the first L stages of shift register SR7. The outputs of multipliers 59, 60, ..., 61 are connected to the inputs of a summer 62. The outputs of the L stages of register R2 are respectively connected to a first input of L multipliers 63, 64, ..., 65, the second inputs of which are connected to the outputs of the first L stages of shift register SR8. The outputs of multipliers 63, 64, ..., 65 are connected to the inputs of a summer 66. The outputs of the L stages of R2 are further connected to a first input of L multipliers 67, 68, ..., 69, the second inputs of which are respectively connected to the outputs of the first L stages of SR6. The outputs of multipliers 67, 68, ..., 69 are connected to the inputs of a summer 70. The outputs of summers 58 and 66 are connected to the inputs of an adder 71, the output of which is applied to the input of a shift register SR9. The outputs of summers 62 and 70 are respectively connected to the (−) and (+) inputs of a subtractor 72, the output of which is applied to the input of a shift register SR10. The contents of SR5 and SR10 are shifted under the control of a clock, not shown. This is done at a rate which is not dependent upon the signaling rate and is limited only by the performance of the circuits being used.

The autocorrelation matrix Γ is a complex matrix $$\Gamma = X + jY$$

Γ is a Toeplitz matrix,
X is a symmetric matrix $$X = \begin{bmatrix} X_0 & X_1 & \cdots & X_{L'} \\ X_1 & X_0 & & X_{L'-1} \\ \vdots & & \ddots & \vdots \\ X_{L'} & & & X_0 \end{bmatrix}$$

and Y is an antisymmetric matrix $$Y = \begin{bmatrix} 0 & Y_1 & \cdots & Y_{L'} \\ -Y_1 & 0 & & Y_{L'-1} \\ \vdots & & \ddots & \vdots \\ -Y_{L'} & -Y_{L'-1} & & 0 \end{bmatrix}$$

where $$\begin{aligned} X_i &= \sum_{g=-k}^{l} p_g p_{g+i} + q_g q_{g+i} \\ Y_i &= \sum_{g=-k}^{l} q_g p_{g+i} - p_g q_{g+i} \end{aligned} \quad (16)$$

for $i=0, \ldots, L'$, which corresponds to an equalizer of length $L'+1$.

It will be readily apparent that the device illustrated in the figure makes direct use of relations (16). After L' shifts, the $X_i$ and the $Y_i$ are obtained in shift registers SR9 and SR10.

Having determined matrix Γ, we can now determine the coefficients of the complex equalizer, as mentioned earlier, from relation (7), which is repeated below for convenience:

$$C_{opt} = \Gamma^{-1} R \quad (7)$$

A first solution would be to invert matrix Γ. However, this would require a considerable computing power and it is preferred to solve Eq. (7) by using the well known gradient method discussed, for example, in the article by K. H. Mueller and D. A. Spaulding cited above.

This is an iterative adjustment method which may be defined as $$C^{(n)} = C^{(n-1)} - \mu (\Gamma C^{(n-1)} - R) \quad (17)$$

where $C^{(n-1)}$ and $C^{(n)}$ represent the column vectors of the coefficients at the $(n-1)^{th}$ and $n^{th}$ iterations, respectively, and $\mu$ is a constant.

As n increases, $$C^{(n)} = C^{(n-1)} = C_{opt}$$

and $$\Gamma C_{opt} = R$$

or $$C_{opt} = \Gamma^{-1} R$$

In the case of a complex equalizer, the coefficients are complex numbers $c+jd$, and relation (17) is written $$(C+jD)^{(n)} = (C+jD)^{(n-1)} - \mu \left[ (X+jY)(C+jD)^{(n-1)} - R \right] \quad (18)$$

where C and D are the column vectors of the real and imaginary parts of the equalizer coefficients.

Considering that, in general, $L'+1 > L$ will be selected, vector R is a column vector of length $L'+1$.

$$R = \begin{bmatrix} p_l + jq_l \\ \vdots \\ p_{-k} + jq_{-k} \\ 0 \\ \vdots \\ 0 \end{bmatrix}$$

Relation (18) splits up into two relations:

$$C^{(n)} = C^{(n-1)} - \mu [XC^{(n-1)} - YD^{(n-1)} - P] \quad (19)$$

$$D^{(n)} = D^{(n-1)} - \mu [YC^{(n-1)} + XD^{(n-1)} - Q] \quad (20)$$

where $$P = \begin{bmatrix} p_l \\ \vdots \\ p_{-k} \\ 0 \\ \vdots \\ 0 \end{bmatrix} \quad Q = \begin{bmatrix} q_l \\ \vdots \\ q_{-k} \\ 0 \\ \vdots \\ 0 \end{bmatrix}$$

Relations (19) and (20) can be written in the form $$\begin{bmatrix} c_0^{(n)} \\ c_1^{(n)} \\ \vdots \\ c_{L'}^{(n)} \end{bmatrix} = \begin{bmatrix} c_0^{(n-1)} \\ c_1^{(n-1)} \\ \vdots \\ c_{L'}^{(n-1)} \end{bmatrix} + \begin{bmatrix} \Delta c_0^{(n-1)} \\ \Delta c_1^{(n-1)} \\ \vdots \\ \Delta c_{L'}^{(n-1)} \end{bmatrix} \quad (21)$$

$$\begin{bmatrix} d_0^{(n)} \\ d_1^{(n)} \\ \vdots \\ d_{L'}^{(n)} \end{bmatrix} = \begin{bmatrix} d_0^{(n-1)} \\ d_1^{(n-1)} \\ \vdots \\ d_{L'}^{(n-1)} \end{bmatrix} + \begin{bmatrix} \Delta d_0^{(n-1)} \\ \Delta d_1^{(n-1)} \\ \vdots \\ \Delta d_{L'}^{(n-1)} \end{bmatrix} \quad (22)$$

Figure 5A:
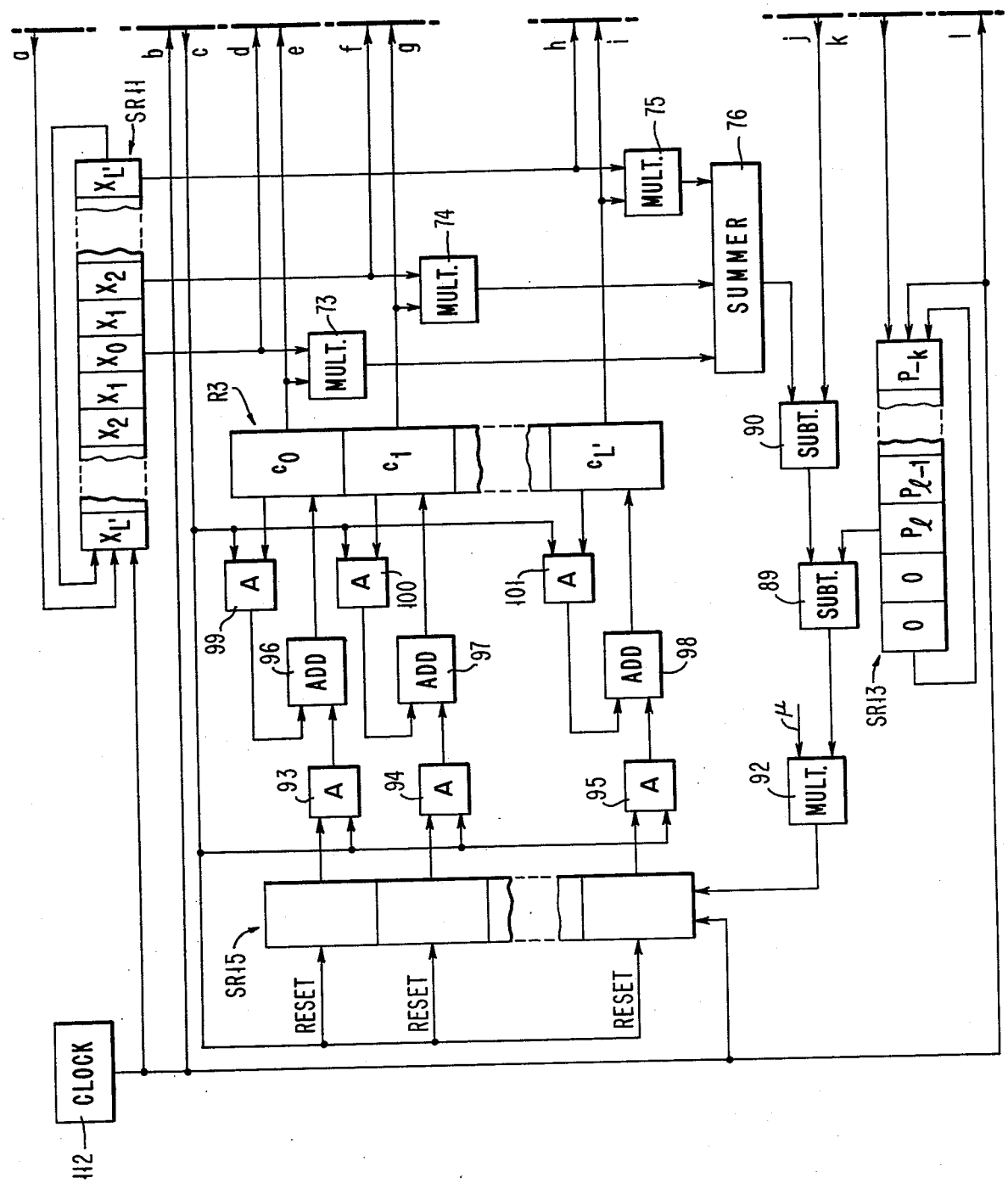
FIGS. 5A, 5B taken together illustrate a device which is shown in block form in FIG. 2 and is used to determine the values of the equalizer coefficients.
Figure 5B:
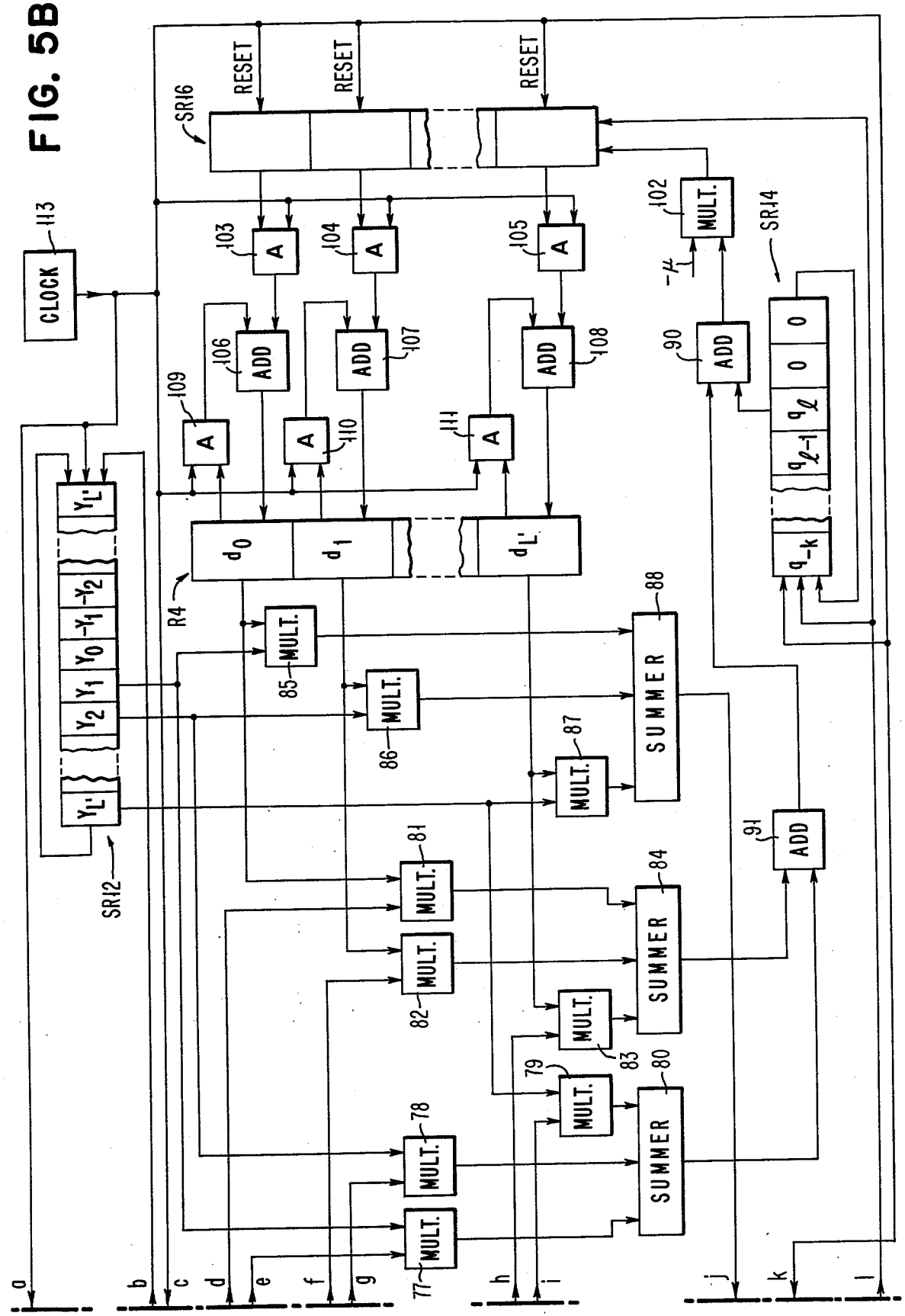

FIGS. 5A, 5B taken together illustrate an exemplary digital embodiment of the device 25 which uses relations (19) and (20) to determine the values of the coefficients. Interconnections in FIG. 5B which are the same as those in FIG. 5A are identified by the same reference letters $a - 1$. The device of FIGS. 5A, 5B includes two shift registers SR11 (FIG. 5A) and SR12 (FIG. 5B) which comprise $(2L'+1)$ stages and employ feedback connections, and two registers R3 (FIG. 5A) and R4 (FIG. 5B) comprising $(L'+1)$ stages. The outputs of the $(L'+1)$ stages of R3 are respectively connected to a first input of $(L'+1)$ multipliers 73, 74, . . . , 75 (FIG. 5A). The second inputs of multipliers 75, . . . , 74, 73 are respectively connected to the outputs of the first $(L'+1)$ stages of SR11. The outputs of multipliers 73, 74, . . . , 75 are connected to the inputs of a summer 76 (FIG. 5A). In addition, the outputs of the $(L'+1)$ stages of R3 are respectively connected to a first input of $(L'+1)$ multipliers 77, 78, . . . , 79 (FIG. 5B). The second inputs of multipliers 79, . . . , 78, 77 are respectively connected to the outputs of the first $(L'+1)$ stages of SR12. The outputs of multipliers 77, 78, . . . , 79 are connected to the inputs of a summer 80 (FIG. 5B). The outputs of the $(L'+1)$ stages of R4 are respectively connected to a first input of $(L'+1)$ multipliers 81, 82, . . . , 83 (FIG. 5B). The second inputs of multipliers 83, . . . , 82, 81 are respectively connected to the outputs of $(L'+1)$ stages of SR11 (FIG. 5A). The outputs of multipliers 81, 82, . . . , 83 are connected to the inputs of a summer 84 (FIG. 5B). Additionally, the outputs of the $(L'+1)$ stages of R4 are respectively connected to a first input of $(L'+1)$ multipliers 85, 86, . . . , 87 (FIG. 5B). The second inputs of multipliers 87, . . . , 86, 85 are respectively connected to the outputs of the first $(L'+1)$ stages of SR12. The outputs of multipliers 85, 86, . . . , 87 are connected to the inputs of a summer 88 (FIG. 5B). As illustrated, the device further includes two shift registers SR13 (FIG. 5A) and SR14 (FIG. 5B) which comprise $(L'+1)$ stages and utilize feedback connections. The output of the $(k+l+1)^{th}$ stage of SR13 is connected to the $(+)$ input of a subtractor 89 (FIG. 5A). The $(-)$ input of subtractor 89 is connected to the output of a subtractor 90 (FIG. 5A), the $(+)$ and $(-)$ inputs of which are respectively connected to the outputs of summers 76 (FIG. 5A) and 88 (FIG. 5B). The output of the $(k+l+1)^{th}$ stage of SR14 is connected to an input of an adder 90' (FIG. 5B). The other input of adder 90' is connected to the output of an adder 91 (FIG. 5B), the inputs of which are respectively connected to the outputs of summers 80 and 84. The output of subtractor 89 is fed to a multiplier 92 (FIG. 5A) in which it is multiplied by the constant $\mu$. The output of multiplier 92 is fed to a shift register SR15 (FIG. 5A) comprising $(L'+1)$ stages, the outputs of which are respectively connected to an input of $(L'+1)$ AND gates 93, 94, . . . , 95 (FIG. 5A), with AND gates 93 and 95 being connected to the outputs of the last stage and of the first stage of SR15 (FIG. 5A) respectively. The outputs of AND gates 93, 94, . . . , 95 are respectively connected to an input of $(L'+1)$ adders 96, 97, . . . , 98 (FIG. 5A), the outputs of which are respectively applied to the first, second, . . . , last stages of register R3 (FIG. 5A). The outputs of the first, second, . . . , last stages of R3 are respectively applied to the other input of adders 96, 97, . . . , 98 through AND gates 99, 100, . . . , 101 (FIG. 5A). The output of adder 90' is applied to the input of a multiplier 102 (FIG. 5B) in which it is multiplied by the constant $-\mu$. The output of multiplier 102 is connected to the input of a shift register SR16 (FIG. 5B) comprising $(L'+1)$ stages. The outputs of the first, second, . . . , last stages of SR16 are respectively connected to an input of $(L'+1)$ AND gates 103, 104, . . . , 105 (FIG. 5B), the outputs of which are respectively connected to an input of $(L'+1)$ adders 106, 107, . . . , 108 (FIG. 5B). The outputs of adders 106, 107, . . . , 108 are respectively applied to the first, second, . . . , last stages of register R4 (FIG. 5B) the outputs of which stages are respectively connected to the other input of adders 106, 107, . . . , 108 through AND gates 109, 110, . . . , 111 (FIG. 5B). The contents of shift registers SR11–SR16 are shifted at a first rate under control of a first clock 112 (FIG. 5A). The contents of shift registers SR11–SR14 are shifted at a second rate under control of a second clock 113 (FIG. 5B), which also controls the opening of AND gates 93–95, 99–101, 103–105, 109–111, and the resetting to zero of shift registers SR15 and SR16.

In operation, the $X_i$ and $Y_i$ are stored in SR11 (FIG. 5A) and SR12 (FIG. 5B). The equalizer coefficients $c_i$ and $d_i$ are stored in registers R3 (FIG. 5A) and R4 (FIG. 5B). The components of vectors P and Q are stored in SR13 (FIG. 5A) and SR14 (FIG. 5B), as illustrated. It is assumed that the values of coefficients $c_i$ and $d_i$ that are stored in R3 and R4 are those obtained after the $(n-1)^{th}$ iteration. Summers 76, 80, 84 and 88 provide the values of matrix products $XC^{(n-1)}$, $YC^{(n-1)}$, $XD^{(n-1)}$ and $YD^{(n-1)}$ in relations (20) and (19). Subtractor 90 provides the difference $XC^{(n-1)} - YD^{(n-1)}$ which is subtracted from the first component of vector P by subtractor 89. The output of subtractor 89 is multiplied by $\mu$ in multiplier 92. Multiplier 92 provides the incremental change $\Delta c_o^{(n-1)}$ (defined by relation (21)) in the value of the first coefficient $c_o$.

The increment $\Delta c_o^{(n-1)}$ is stored in the first stage of SR15 (FIG. 5A). Similarly, multiplier 102 provides the incremental change $\Delta d_o^{(n-1)}$ in the value of the first coefficient $d_o$ which is stored in the first stage of SR16 (FIG. 5B).

The contents of SR11-SR16 are then shifted one position under control of clock 112 and the increments $\Delta c_1^{(n-1)}$ and $\Delta d_1^{(n-1)}$ are calculated and stored in SR15 and SR16. After $(L'+1)$ shifts the increments $\Delta c_o^{(n-1)}$, $\Delta c_1^{(n-1)} \ldots \Delta c_{L'+1}^{(n-1)}$ are available in the first, second, ..., last stages of SR15 while the increments $\Delta d_o^{(n-1)}$, $\Delta d_1^{(n-1)} \ldots \Delta d_{L'+1}^{(n-1)}$ are available in the first, second, ..., last stages of SR16. Then, increments $\Delta c_i^{(n-1)}$ and $\Delta d_i^{(n-1)}$ are respectively added to the values of coefficients $c_i^{(n-1)}$ and $d_i^{(n-1)}$ stored in R3 and R4 to provide the new values of coefficients $c_i^{(n)}$ and $d_i^{(n)}$, for storage in R3 and R4. The contents of SR11-SR14 are then shifted $L'$ positions to return to their original configurations and SR15 and SR16 are reset to zero, under control of clock 113. Another iteration then takes place. After a suitable number of iterations, the coefficient values contained in R3 and R4 are sent to the equalizer 18 via lines 19, not shown in FIGS. 5A, 5B.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A method for determining the initial values of the coefficients of a complex transversal equalizer in a synchronous data transmission system employing Double Side Band-Quadrature Carrier (DSB-QC) modulation on a transmission channel having variable distortion from message to message, said initial values of the coefficients being derived from a received training sequence comprising the steps of:
   generating a CAZAC sequence with is a periodic psuedo-random sequence of complex numbers all of which have a constant amplitude said sequence having a periodic autocorrelation function all the coefficients of which except the first are zero,
   modifying said CAZAC sequence to provide a modified CAZAC sequence in the form of a resultant signal which is a complex signal representing the real and imaginary parts of said CAZAC sequence, transmitting said modified CAZAC sequence over said transmission channel during a training period, and
   determining the initial values of said coefficients of said complex transversal equalizer from said modified CAZAC sequence during said training period.

2. A method according to claim 1, wherein the step of generating said CAZAC sequence includes the steps of: forming from the binary pseudo-random sequences of length L a sequence $(a_i)$ such that $A_o=L$ and $A_g=-1$ for $g=1, \ldots (L-1)$,
wherein $$A_g = \sum_{i=o}^{L} a_i a_{i+g}$$

$A_g$ being the $g^{th}$ coefficient of the periodic autocorrelation function of $(a_i)$, and,
adding to each of the elements of sequence $(a_i)$ an imaginary constant $ja$ wherein $$a = \pm 1/\sqrt{L}.$$

3. Method according to claim 1, wherein the step of generating said CAZAC sequence includes the step of: forming a sequence $(u_i)$ of length $L=K^2$, with K being a positive integer, defined as $$u_i = W^{\beta\gamma}$$

wherein
$\beta, \gamma = 0, 1, \ldots (K-1)$ $i = K\beta + \gamma = 0, 1, \ldots (L-1)$ $W$ is a primitive $K^{th}$ root of unity.

4. Method according to claim 1, wherein the step of generating said CAZAC sequence includes the step of: forming a sequence $(u_i)$ of length L=odd integer, defined as $$u_i = W^{i^2}$$

wherein
$i = 0, 1, \ldots, (L-1)$
$W$ is a primitive $L^{th}$ root of unity.

5. Method according to claim 1, wherein the step of generating said CAZAC sequence includes the step of: forming a sequence $(u_i)$ of length $L = m^{2K+1}$, with m and K being positive integers, defined as $$u_i = a_{\beta \, (modulo \, m)} W^{\beta\gamma}$$

wherein
$(a_n)$ is a CAZAC sequence of length m
$n = 0, 1, \ldots (m-1)$
$\beta = 0, 1, \ldots (M-1)$ $M = m^{K+1}$
$\gamma = 0, 1, \ldots (N-1)$ $N = m^K$
$i = M\beta + \gamma$
$W$ is a primitive $M^{th}$ root of unity.

6. Method according to claim 1, wherein the step of generating said CAZAC sequence includes the step of: forming a sequence $(u_i)$ of length $L=4m$ derived from two CAZAC sequences $(a_i)$ and $(b_i)$ of length $m$, said sequence $(u_i)$ being defined by $$u_{2k} = a_{k \, (modulo \, m)}$$

$$u_{2k+1} = b_{k \, (modulo \, m)} W^k$$

wherein
$k = 0, 1, \ldots (2m-1)$
$W$ is a primitive $(2m)^{th}$ root of unity.

7. Method according to claim 1, wherein the step of generating said CAZAC sequence includes the step of forming a sequence $(u_i)$ of length $L=mxn$, with $m$ being relatively prime to $b$, defined as $$u_i = a_{i \, (modulo \, m)} \times b_{i \, (modulo \, n)}$$

$i = 1, 2, \ldots, m \times n$ where $(a_i)$ and $(b_i)$ are CAZAC sequences of length $m$ and $n$, respectively.

8. A method according to claim 1 wherein the step of modifying said CAZAC sequence includes the steps of
storing the real and imaginary parts of said CAZAC sequence,
providing a pair of carriers the phases of which are in phase quadrature,
modulating one and the other of said pair of carriers with the real and imaginary parts of said stored CAZAC sequence, and
subtracting said modulated carriers to provide a resultant signal which is a complex signal representing during each signalling interval the real and imaginary parts of the CAZAC sequence which modulated said pair of carriers.

9. Method according to claim 1, wherein the step of determining the initial values of the coefficients includes the steps of:
determining the samples $r_n$ of said transmission channel impulse response obtained by correlating over a given period of time L the elements of the received sequence $(z_i)$ with those of the transmitted sequence $(u_i)$,
calculating the autocorrelation matrix $\Gamma$ of the samples $r_n$, and
determining the initial values of the coefficients from the relation $$c_{opt} = \Gamma^{-1} R$$

wherein
$c_{opt}$ is the column vector of the coefficient values
$\Gamma^{-1}$ is the inverse of matrix $\Gamma$, and
$R$ is the inverted column vector of $r_n$.

10. Method according to claim 9, wherein the determination of the initial values of the coefficients from the relation $$C_{opt} = \Gamma^{-1} R$$

is arrived at by using the gradient method defined by $$C^{(n)} = C^{(n-1)} + \mu (\Gamma C^{(n-1)} - R)$$

wherein
$C^{(n-1)}$ and $C^{(n)}$ represent the column vectors of the coefficients at the $(n-1)^{th}$ and $n^{th}$ iterations, respectively, and
$\mu$ is a constant.

11. Method according to claim 9, wherein the samples $r_n$ of the impulse response are determined from the relation $$r_g = \frac{1}{U_o} \sum_{i=o}^{L-1} z_{i+g} u_i^*$$

wherein
$U_o$ is the first coefficient of the periodic autocorrelation function of the transmitted CAZAC sequence,
$u_i^*$ is the conjugate complex of $u_i$.

12. Method according to claim 11, wherein $$U_o = L.$$

* * * * *